J. WIDMER-ACKERMANN.
APPARATUS FOR MOLDING LIQUIDS WHICH SOLIDIFY WHEN COLD.
APPLICATION FILED FEB. 17, 1908.

953,249.

Patented Mar. 29, 1910.

UNITED STATES PATENT OFFICE.

JAKOB WIDMER-ACKERMANN, OF ZURICH, SWITZERLAND.

APPARATUS FOR MOLDING LIQUIDS WHICH SOLIDIFY WHEN COLD.

953,249.  Specification of Letters Patent. Patented Mar. 29, 1910.

Application filed February 17, 1908. Serial No. 416,304.

*To all whom it may concern:*

Be it known that I, JAKOB WIDMER-ACKERMANN, a citizen of Switzerland, residing at Zurich, IV, Switzerland, have invented new and useful Improvements in Apparatus for Molding Liquids which Solidify when Cold, of which the following is a specification.

This invention relates to improvements in apparatus for molding liquids which solidify when cold, particularly such as cocoa-nut butter, and the object is to provide means which facilitate the removal of the solidified liquids from the apparatus. I attain this object by the means illustrated in the accompanying drawing, in which—

Figure 1:
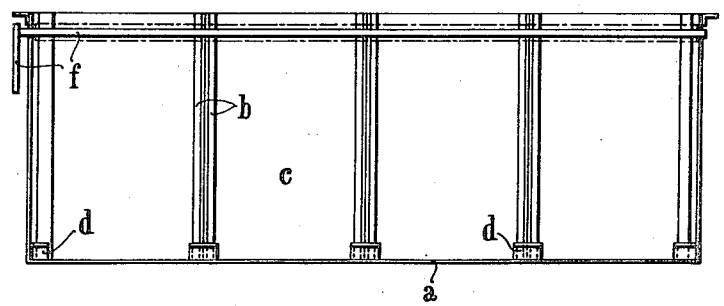
Figure 2:
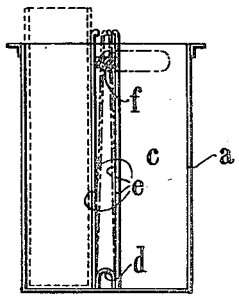
Figure 3:
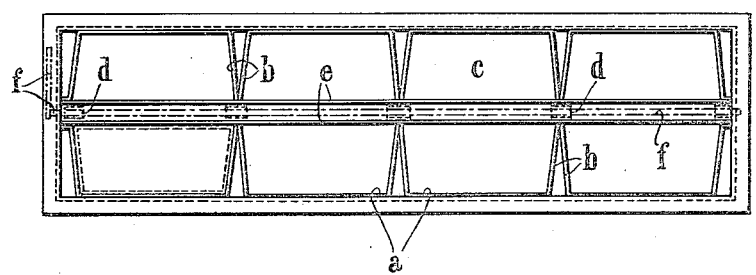

Figure 1 is a longitudinal section and Fig. 2 a cross section, and Fig. 3 a plan of an apparatus constructed in accordance with one embodiment of my invention.

Similar letters refer to similar parts throughout the several views.

Referring to the figures generally my improved apparatus consists of a vessel *a* divided internally into a number of compartments *c* by means of inwardly inclining walls *b* which compartments are arranged in two parallel rows with a space between them. Upon the bottom of the vessel *a* are arranged in the space between the said two rows abutment pieces *d* against which bear the lower parts of two movable walls *e* which close the said compartments inside of the apparatus.

In order to permit of pressing the walls *e* against the walls *b* a turnable shaft, for instance a flat bar *f* extending along the walls *e* is suitably mounted in the space between the same. The part of this shaft outside the vessel *a* is bent at a right angle and serves as a handle for turning the shaft. If the sides of the shaft *f* are positioned opposite the walls *e* the latter can be moved toward each other and the respective compartments *c* opened, that is to say widened.

When using the apparatus described, say for cocoa-nut butter, wrappers say of parchment paper are inserted into the various compartments which exactly fit the same. The latter are then closed by the said movable walls *e* by turning the shaft *f* and thereby force its edges against the walls *e* and the warm liquid cocoa-nut oil is afterward poured into the said wrappers which latter will then tightly and evenly fit against the walls of the compartments. In order to render the said wrappers at once impervious to oil, the cocoa-nut butter is only heated to a temperature of about 2 degrees C. above solidifying point (say to about 23 degrees C.) so that the cool walls and the wrappers will cause a thin layer of butter to solidify at once, which prevents the butter yet liquid from soaking through. To cause the butter to cool as quickly as possible the apparatus described is preferably constructed to permit of cooling the walls with water. After the mass in all the compartments has solidified the movable walls are released and thereby all the compartments widened which permits the ready removal of filled wrappers, particularly as the compartments are widened in the direction of the walls *e*.

The apparatus described may have any desired number of compartments to produce a corresponding number of slabs or the like of cocoa-nut butter simultaneously.

In practice a number of the molds described are placed side by side in a tank containing water for cooling. By the time the last apparatus has been filled, the contents of the one filled first will have solidified and such apparatus be ready for refilling, which renders the working of the installation continuous. The slabs or the like taken out, are packed completely by closing up the side of the wrapper left open. In this manner practical as well as hygienic requirements are met, the touching of the slabs or the like with the hands being practically entirely obviated.

I claim:

In an apparatus for molding in wrappers, liquids which solidify when cold, two series of molding compartments arranged parallel to each other, each of the said compartments comprising an open side and two walls diverging toward the said open side, a movable wall for each of the said series of compartments and a turnable bar between and bearing against the whole length of the said loose wall to press and lock the same against the edges of the said diverging walls, all combined substantially as and for the purpose set forth.

In testimony whereof I have signed my name to this specification in the presence of two subscribing witnesses.

JAKOB WIDMER-ACKERMANN.

Witnesses:
 HEINRICH RINDERKNECHT,
 A. LIEBERKNECHT.